US012098810B2

(12) United States Patent
Tsuge

(10) Patent No.: US 12,098,810 B2
(45) Date of Patent: Sep. 24, 2024

(54) ILLUMINATION APPARATUS

(71) Applicant: MAKITA CORPORATION, Anjo (JP)

(72) Inventor: Kazunori Tsuge, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/196,557

(22) Filed: May 12, 2023

(65) Prior Publication Data

US 2024/0003503 A1 Jan. 4, 2024

(30) Foreign Application Priority Data

Jun. 29, 2022 (JP) ................................ 2022-104157

(51) Int. Cl.
*F21L 4/02* (2006.01)
*F21V 3/02* (2006.01)
*F21Y 107/50* (2016.01)

(52) U.S. Cl.
CPC .................. *F21L 4/02* (2013.01); *F21V 3/02* (2013.01); *F21Y 2107/50* (2016.08)

(58) Field of Classification Search
CPC ..... F21L 4/02; F21L 4/027; F21L 4/08; F21V 3/02; F21V 33/008; F21V 33/0084
See application file for complete search history.

(56) References Cited

U.S. PATENT DOCUMENTS

| | | | | |
|---|---|---|---|---|
| 5,169,225 A * | 12/1992 | Palm | B25F 5/021 | 362/118 |
| 6,814,461 B2 * | 11/2004 | Minalga | B25B 23/18 | 315/86 |
| 9,923,249 B2 * | 3/2018 | Rejman | B25F 5/02 | |
| 11,472,016 B2 * | 10/2022 | Gisselman | B25F 5/029 | |
| 2004/0174699 A1 * | 9/2004 | Minalga | B25B 23/18 | 362/119 |
| 2007/0278995 A1 * | 12/2007 | Batdorff | H01M 50/247 | 320/107 |
| 2015/0029701 A1 * | 1/2015 | Weidman | F21L 4/02 | 362/102 |
| 2016/0172722 A1 * | 6/2016 | Rejman | H01M 10/425 | 429/7 |
| 2016/0223185 A1 * | 8/2016 | Harvey | F21L 4/00 | |

FOREIGN PATENT DOCUMENTS

| | | | | |
|---|---|---|---|---|
| DE | 102022112869 A1 * | 12/2022 | B25B 23/18 |
| JP | 6982732 B2 | 12/2021 | |
| WO | WO-2017147019 A1 * | 8/2017 | F21L 14/02 |

* cited by examiner

*Primary Examiner* — Alexander K Garlen
(74) *Attorney, Agent, or Firm* — Oliff PLC

(57) ABSTRACT

To efficiently illuminate a wide area, an illumination apparatus includes a housing, a light emitter, and a light-transmissive member supported by the housing. The housing has an outer surface including a first outer surface and a second outer surface adjacent to the first outer surface. The second outer surface faces in a direction different from a direction in which the first outer surface faces. The light emitter is operable with power supplied from a battery pack. The light-transmissive member is transmissive to at least part of light from the light emitter and extends on the first outer surface and on the second outer surface.

17 Claims, 16 Drawing Sheets

ILLUMINATION APPARATUS

CROSS-REFERENCE TO RELATED APPLICATIONS

This application claims the benefit of priority to Japanese Patent Application No. 2022-104157, filed on Jun. 29, 2022, the entire contents of which are hereby incorporated by reference.

BACKGROUND

1. Technical Field

The present disclosure relates to an illumination apparatus.

2. Description of the Background

In the technical field of illumination apparatuses, a known portable electric light is described in Japanese Patent No. 6982732. This portable electric light includes first light sources and a second light source that are light-emitting diodes (LEDs).

BRIEF SUMMARY

Illumination apparatuses may efficiently illuminate wide areas.

One or more aspects of the present disclosure are directed to an illumination apparatus that efficiently illuminates a wide area.

A first aspect of the present disclosure provides an illumination apparatus, including:

- a housing having an outer surface including
  - a first outer surface, and
  - a second outer surface adjacent to the first outer surface, the second outer surface facing in a direction different from a direction in which the first outer surface faces;
- a light emitter operable with power supplied from a battery pack; and
- a light-transmissive member supported by the housing, the light-transmissive member being transmissive to at least part of light from the light emitter, the light-transmissive member extending on the first outer surface and on the second outer surface.

The illumination apparatus according to the above aspect of the present disclosure efficiently illuminates a wide area.

DETAILED DESCRIPTION

Although one or more embodiments of the present disclosure will now be described with reference to the drawings, the present disclosure is not limited to the embodiments. The components in the embodiments described below may be combined as appropriate. One or more components may be eliminated.

In the embodiments, the positional relationships between the components will be described using the directional terms such as front and rear (or frontward and rearward), right and left (or lateral), and up and down (or vertical). The terms indicate relative positions or directions with respect to the center of an illumination apparatus 1. An axis extending in the front-rear direction is referred to as a front-rear axis for convenience. An axis extending in the lateral direction is referred to as a lateral axis for convenience. An axis extending in the vertical direction is referred to as a vertical axis for convenience. The front-rear axis and the lateral axis are orthogonal to each other. The lateral axis and the vertical axis are orthogonal to each other. The vertical axis and the front-rear axis are orthogonal to each other.

Figure 1:
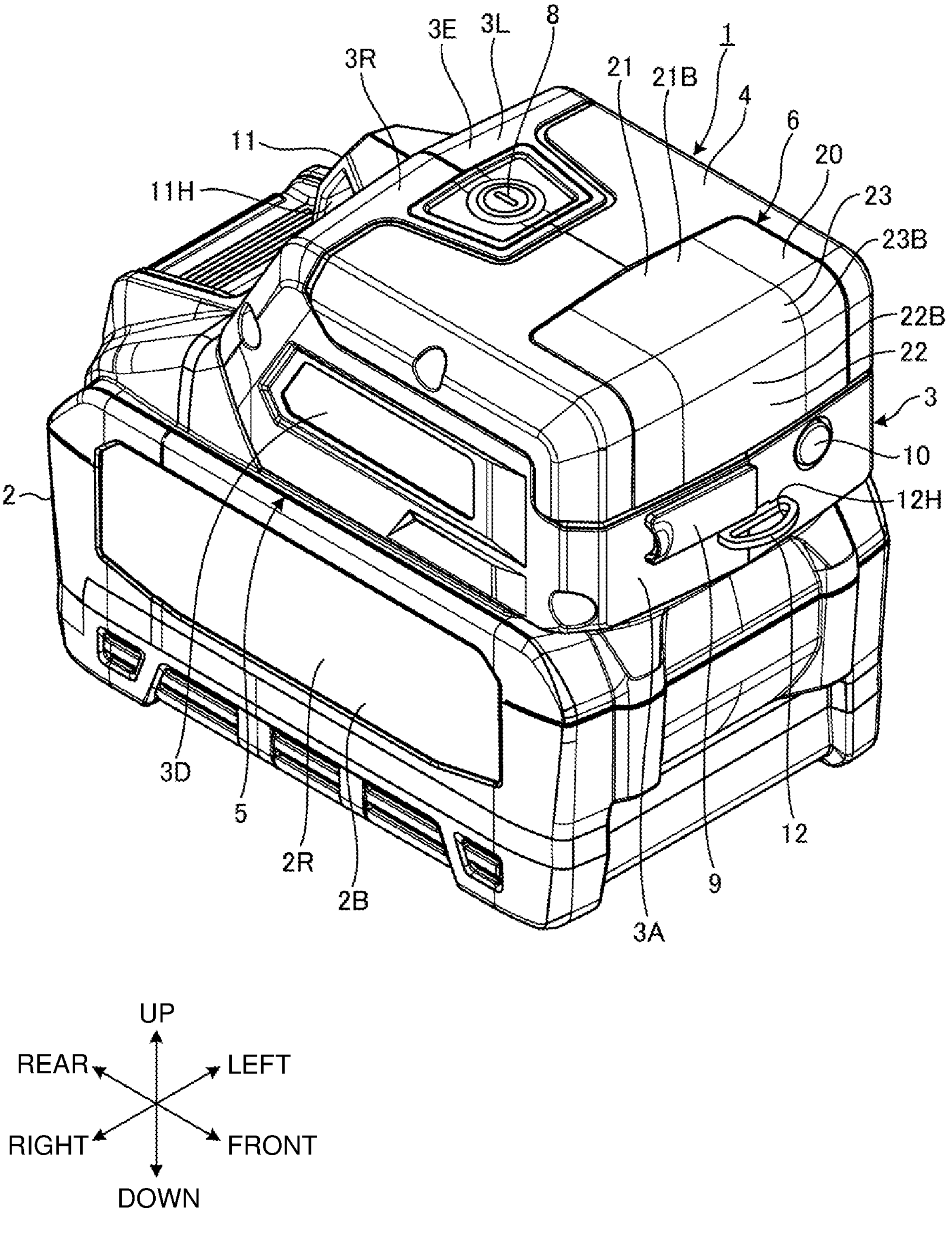
FIG. 1 is a perspective view of an illumination apparatus with a battery pack according to an embodiment as viewed from the right front.
Figure 2:
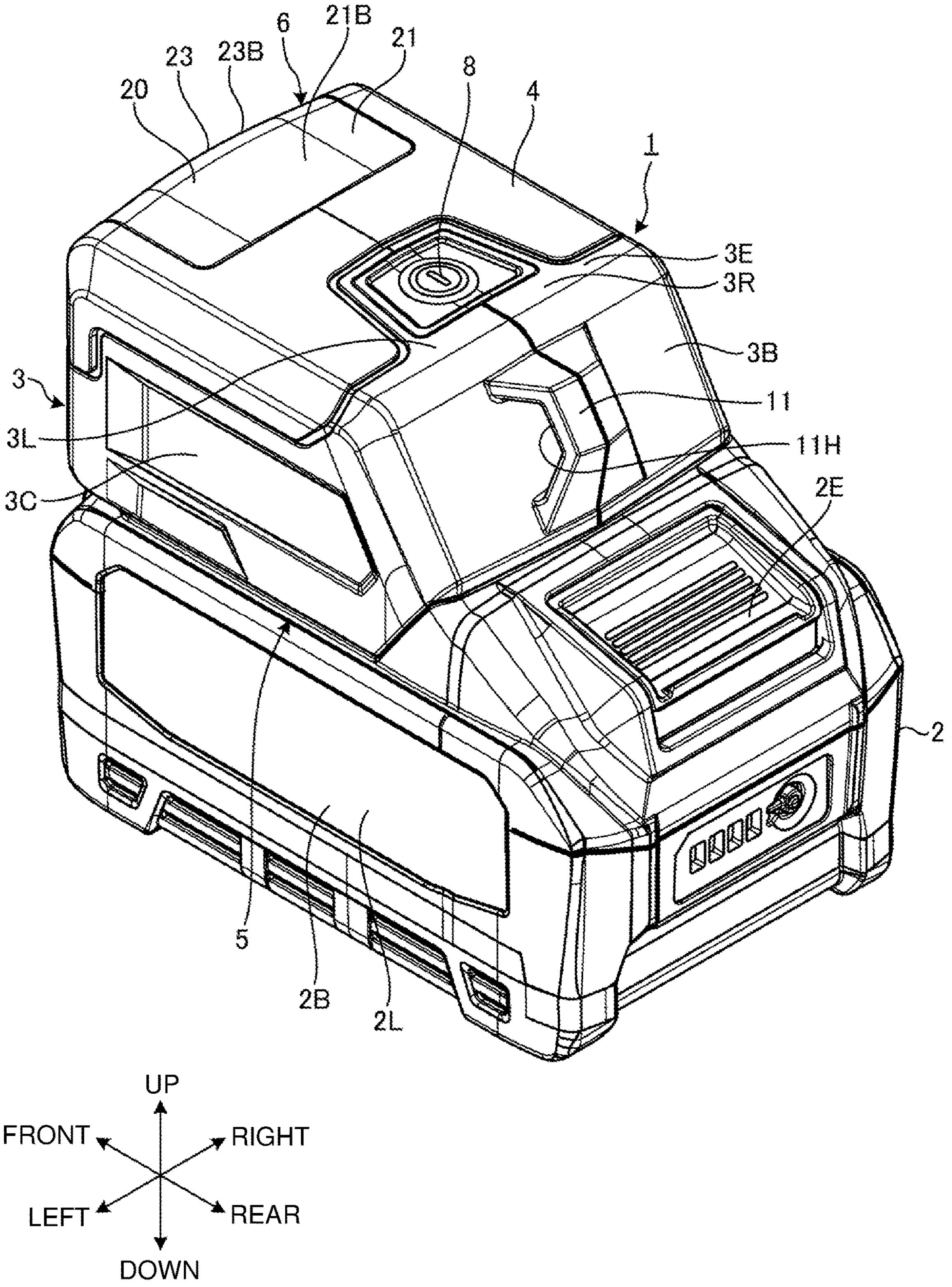
FIG. 2 is a perspective view of the illumination apparatus with the battery pack according to the embodiment as viewed from the left rear.
Figure 3:
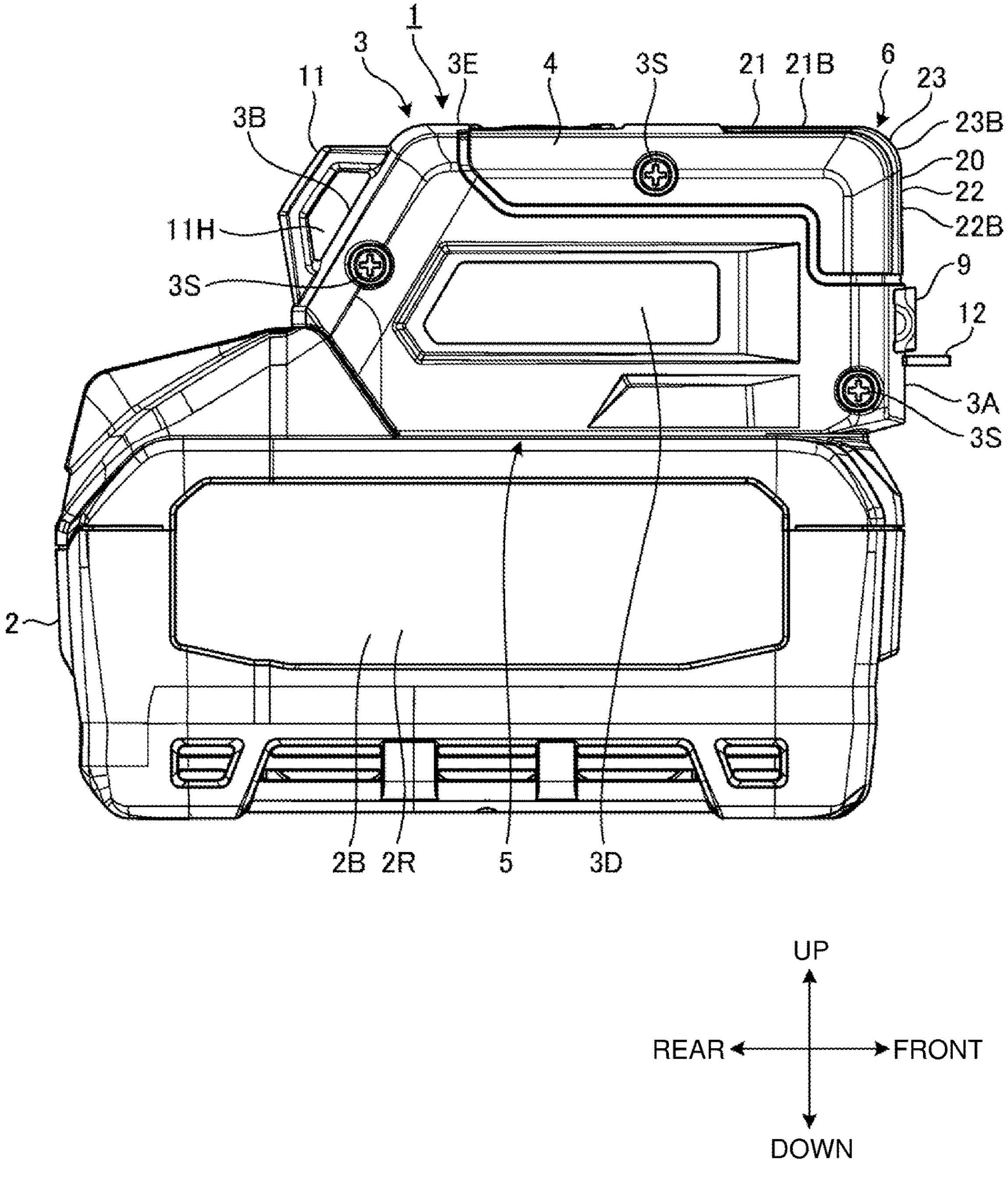
FIG. 3 is a right side view of the illumination apparatus with the battery pack according to the embodiment.
Figure 4:
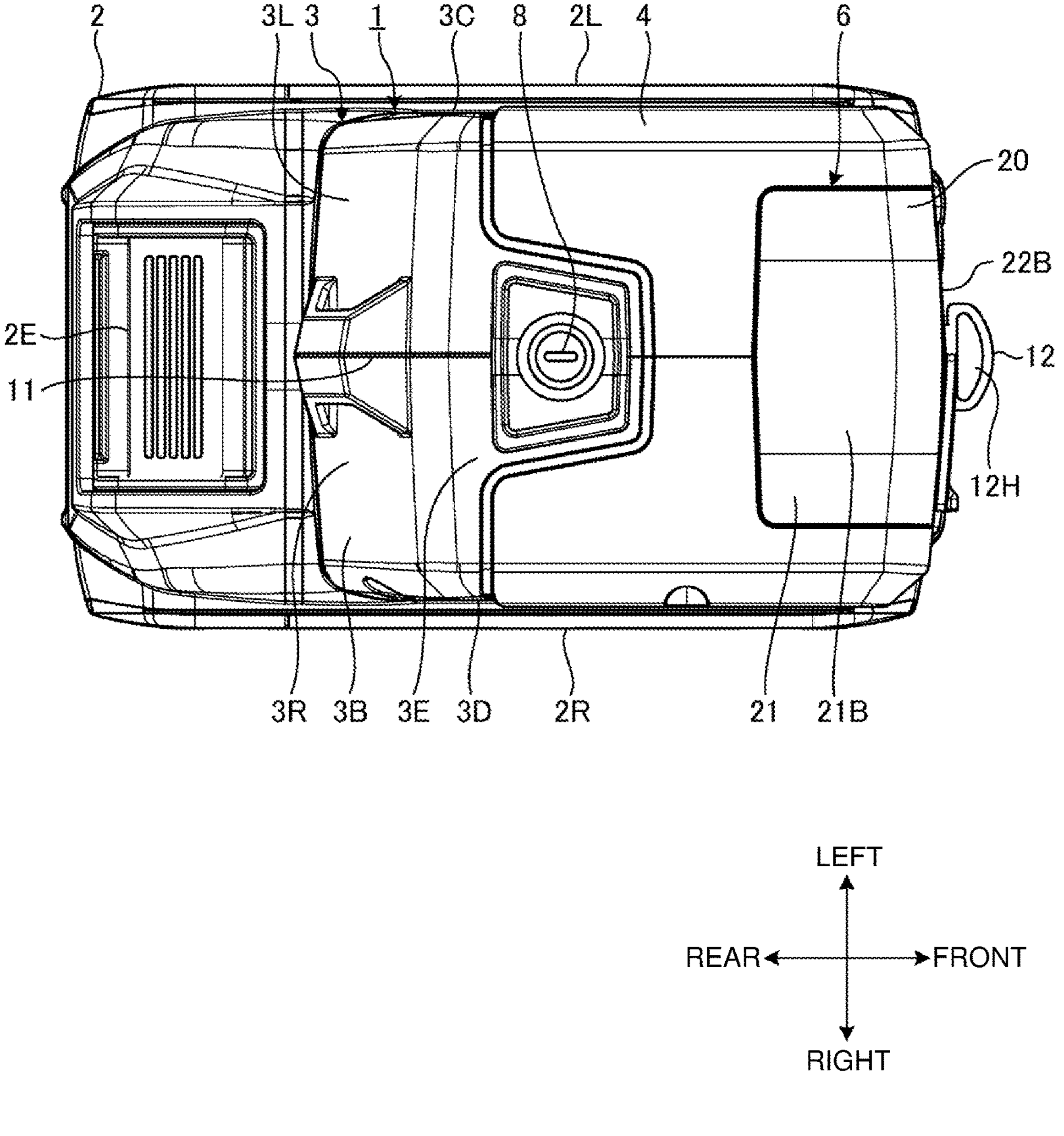
FIG. 4 is a top view of the illumination apparatus with the battery pack according to the embodiment.
Figure 5:
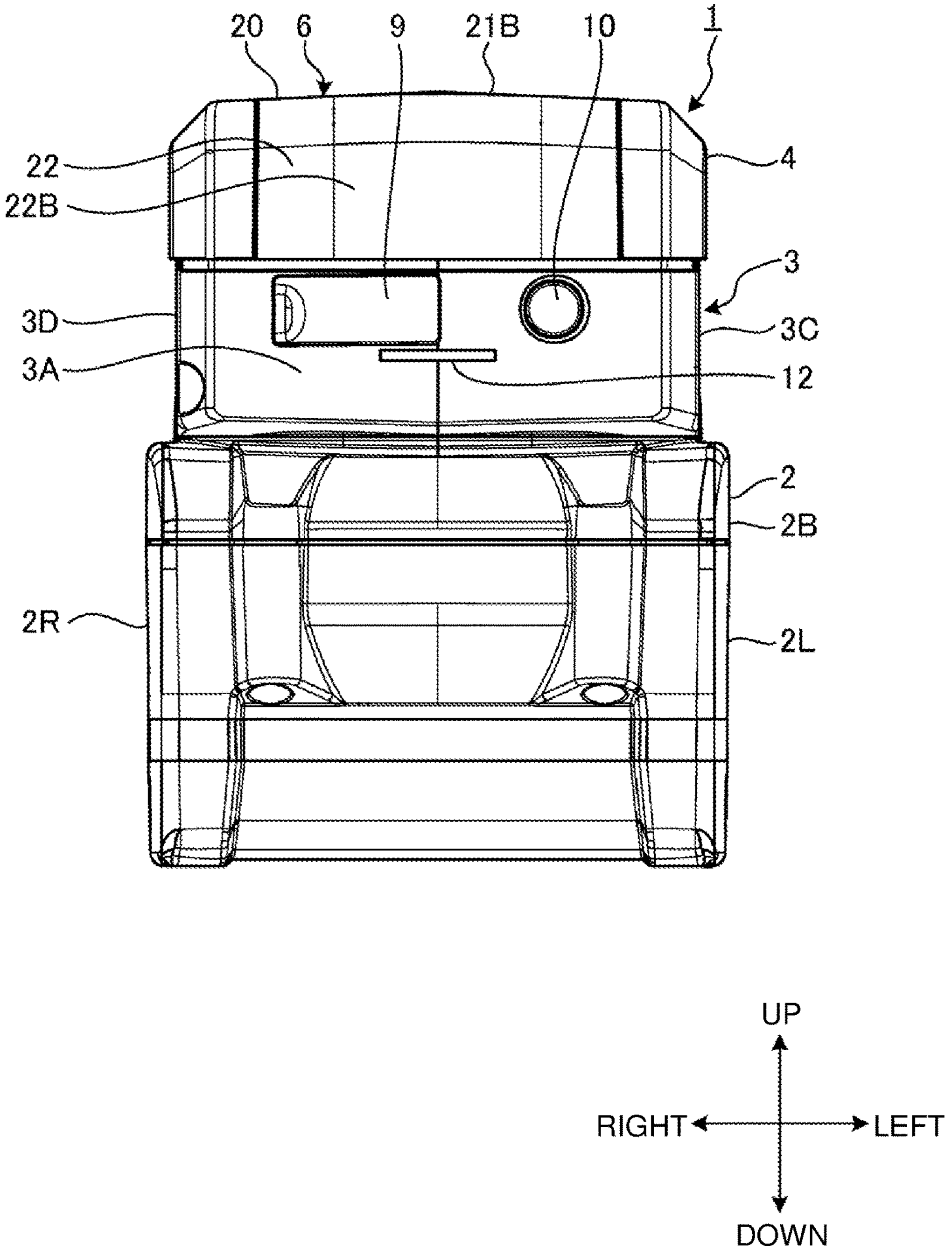
FIG. 5 is a front view of the illumination apparatus with the battery pack according to the embodiment.
Figure 6:
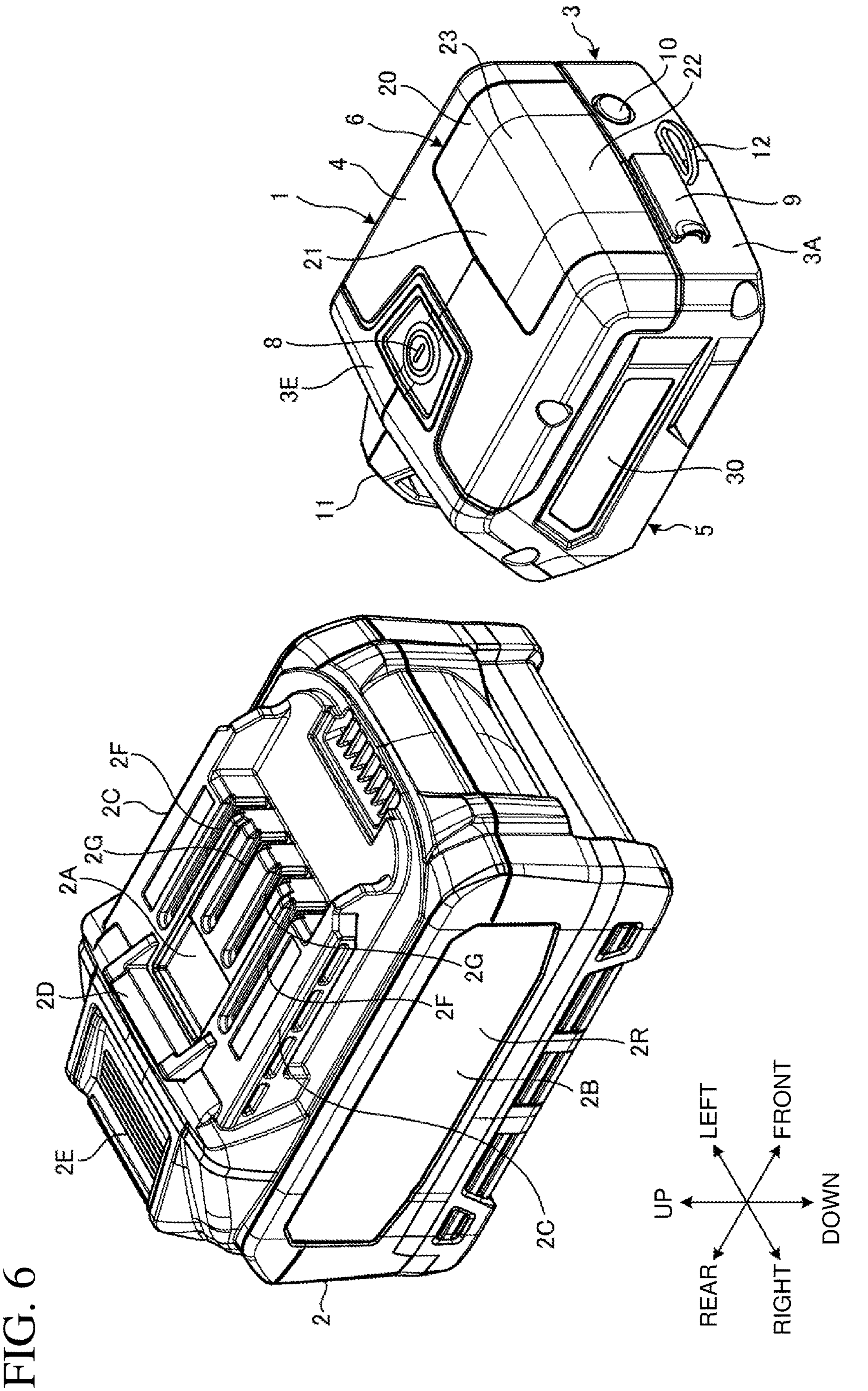
FIG. 6 is a perspective view of the illumination apparatus according to the embodiment detached from the battery pack as viewed from the right front.
Figure 7:
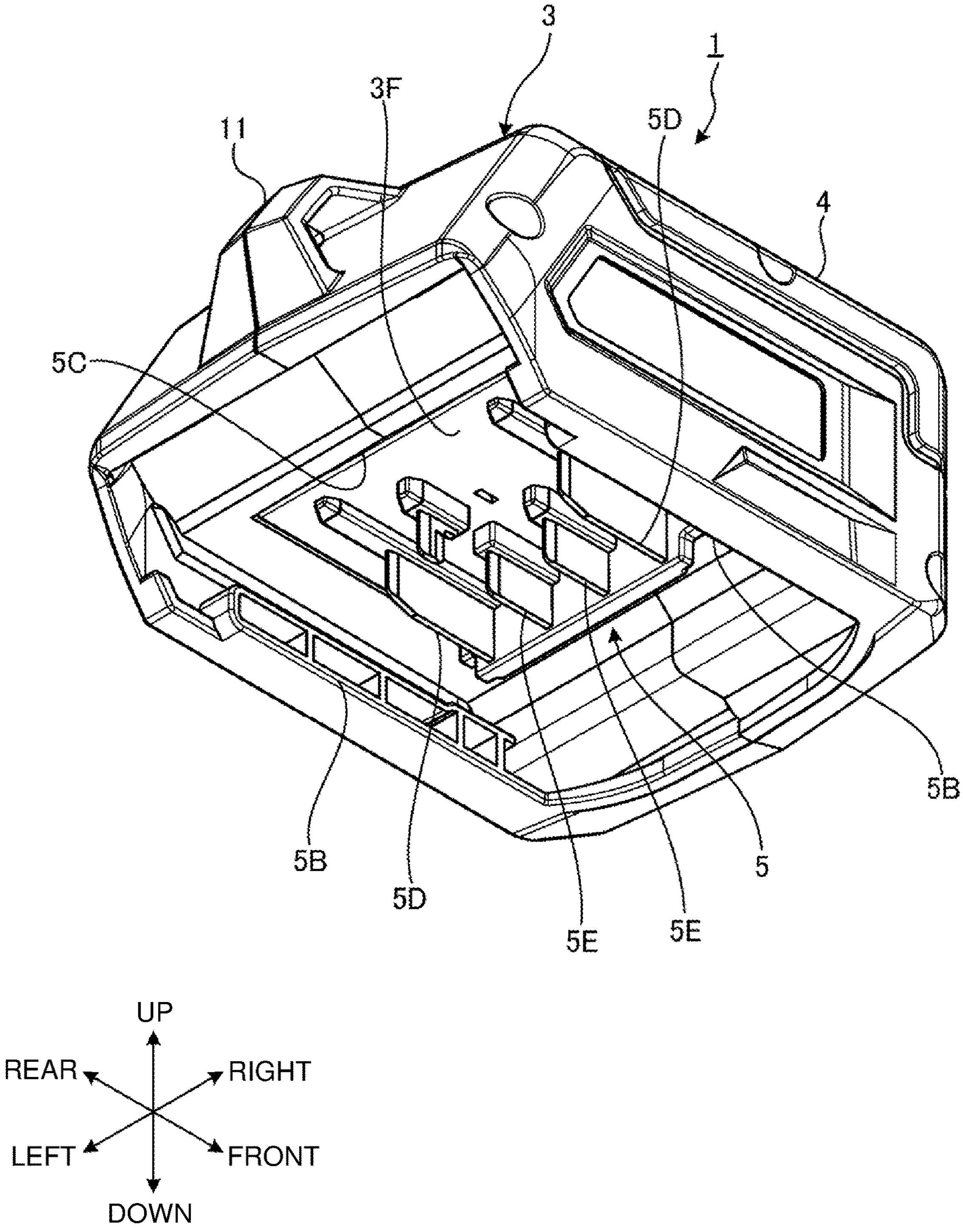
FIG. 7 is a perspective view of the illumination apparatus according to the embodiment as viewed from below.
Figure 8:
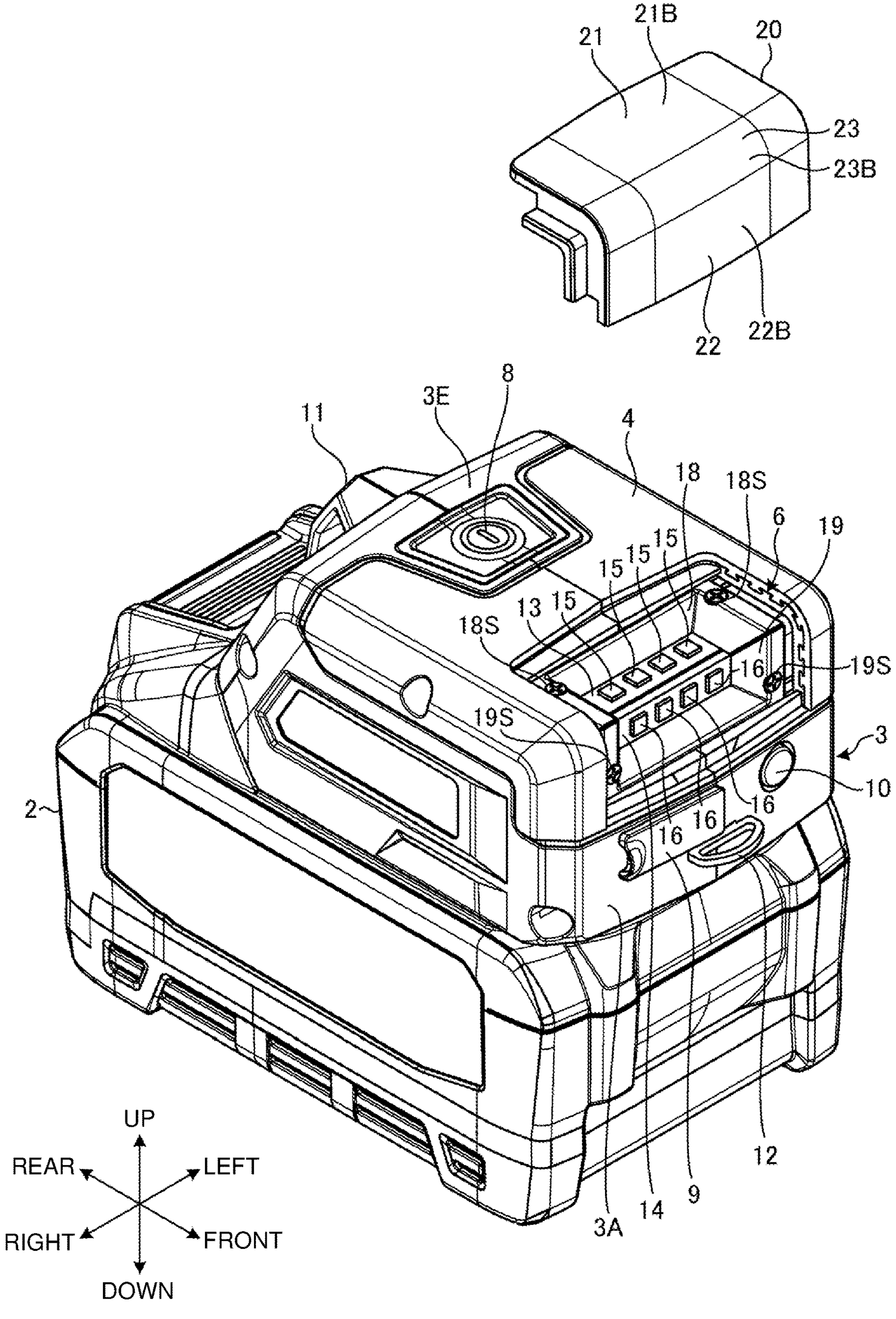
FIG. 8 is an exploded perspective view of the illumination apparatus with the battery pack according to the embodiment as viewed from the right front.
Figure 9:
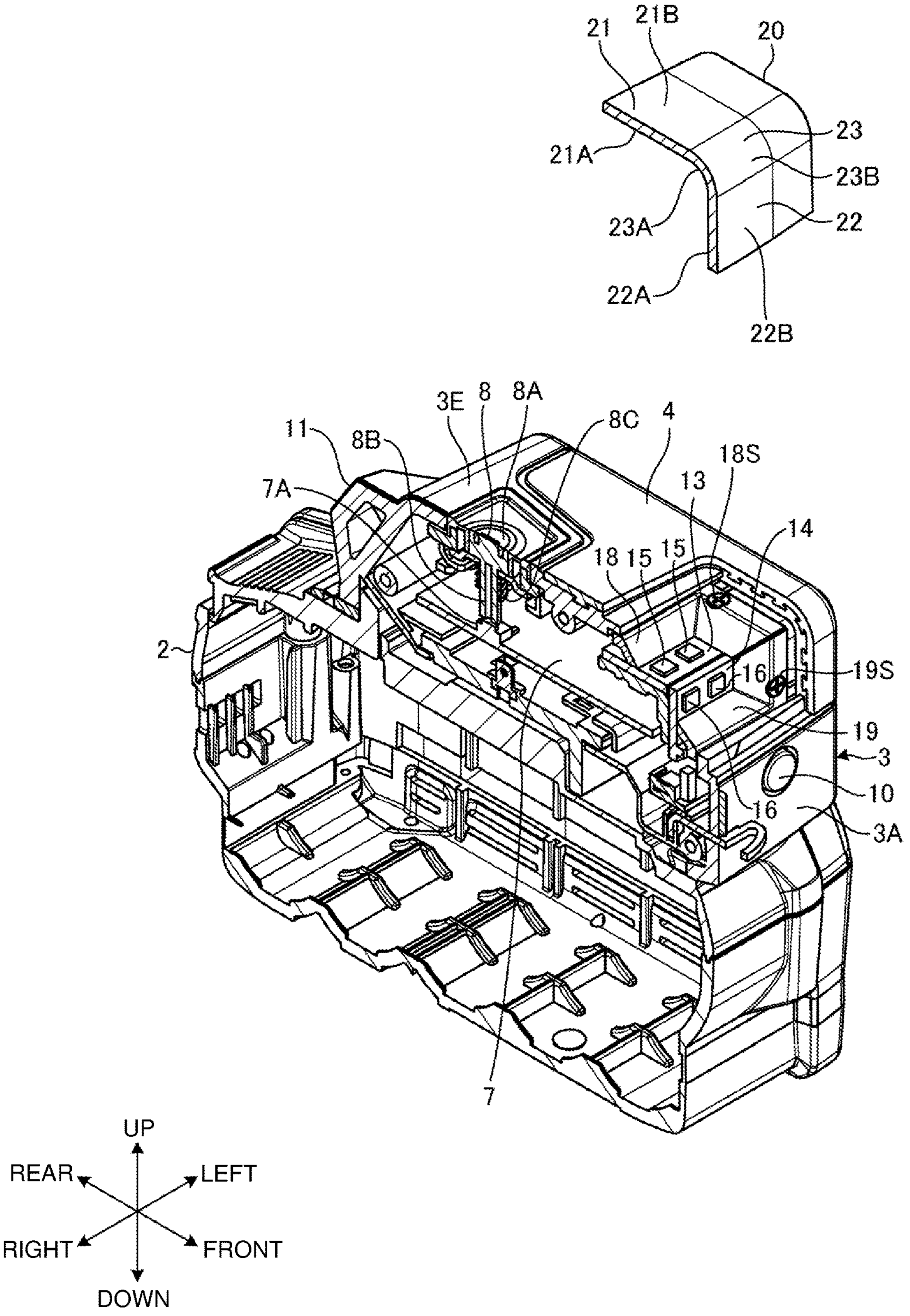
FIG. 9 is a cross-sectional perspective view of the illumination apparatus with the battery pack according to the embodiment as viewed from the right front.
Figure 10:
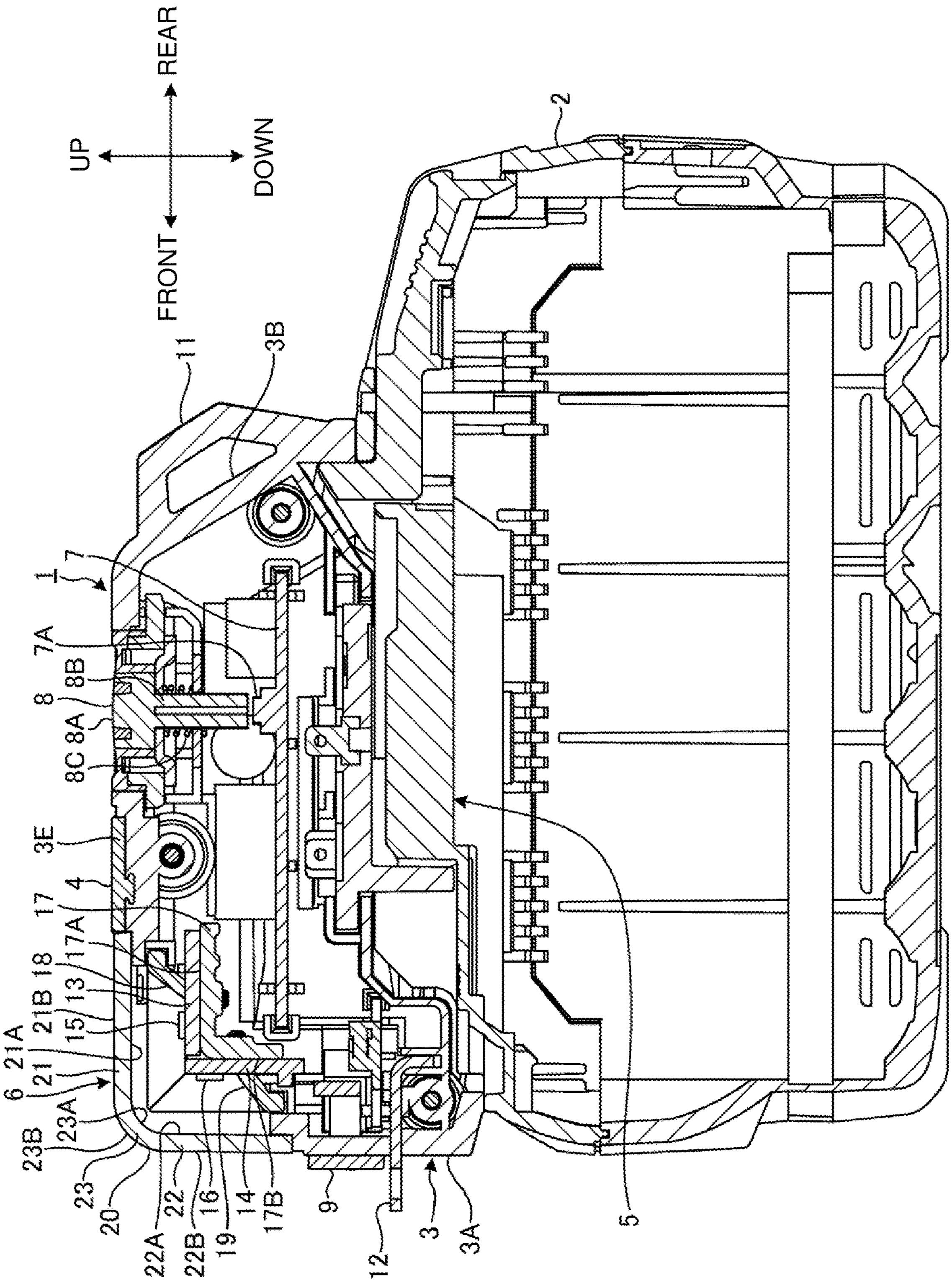
FIG. 10 is a cross-sectional side view of the illumination apparatus with the battery pack according to the embodiment.

FIG. 1 is a perspective view of the illumination apparatus 1 with a battery pack 2 according to an embodiment as viewed from the right front. FIG. 2 is a perspective view of the illumination apparatus 1 with the battery pack 2 as viewed from the left rear. FIG. 3 is a right side view of the illumination apparatus 1 and the battery pack 2. FIG. 4 is a top view of the illumination apparatus 1 and the battery pack 2. FIG. 5 is a front view of the illumination apparatus 1 and the battery pack 2. FIG. 6 is a perspective view of the illumination apparatus 1 detached from the battery pack 2 as viewed from the right front. FIG. 7 is a perspective view of the illumination apparatus 1 as viewed from below. FIG. 8 is an exploded perspective view of the illumination apparatus 1 with the battery pack 2 as viewed from the right front. FIG. 9 is a cross-sectional perspective view of the illumination apparatus 1 with the battery pack 2 as viewed from the right front. FIG. 10 is a cross-sectional side view of the illumination apparatus 1 and the battery pack 2.

The illumination apparatus 1 according to the embodiment is a portable illumination apparatus that can be lifted and carried by a user of the illumination apparatus 1 alone. The illumination apparatus 1 is a rechargeable illumination apparatus that operates with power supplied from the rechargeable battery pack 2.

The user can use the illumination apparatus 1 at a work site. When, for example, work is performed using a power tool at a work site, the illumination apparatus 1 is used to illuminate the power tool or a workpiece. The illumination apparatus 1 is used to illuminate, for example, the hand area of the user.

The illumination apparatus 1 includes a housing 3, a housing cover 4, a battery mount 5, an illuminator 6, a controller 7, a power button 8, an output terminal cover 9, an output button 10, a first coupler 11, and a second coupler 12.

The housing 3 accommodates at least a part of the illuminator 6 and the controller 7. The housing 3 is formed from a synthetic resin. The housing 3 is formed from, for example, an acrylonitrile butadiene styrene (ABS) resin.

The housing 3 has an outer surface including a front surface 3A, a rear surface 3B, a left surface 3C, a right surface 3D, an upper surface 3E, and a lower surface 3F. Each of the front surface 3A, the rear surface 3B, the left surface 3C, the right surface 3D, the upper surface 3E, and the lower surface 3F is substantially flat. The front surface 3A faces frontward. The rear surface 3B faces rearward. The left surface 3C faces leftward. The right surface 3D faces rightward. The upper surface 3E faces upward. The lower surface 3F faces downward. The front surface 3A is substantially orthogonal to the front-rear axis. The rear surface 3B slopes downward toward the rear. The left surface 3C is substantially orthogonal to the lateral axis. The right surface 3D is substantially orthogonal to the lateral axis. The upper surface 3E is substantially orthogonal to the vertical axis.

The upper end of the front surface 3A and the front end of the upper surface 3E are adjacent to each other. The left end of the front surface 3A and the front end of the left surface 3C are adjacent to each other. The right end of the front surface 3A and the front end of the right surface 3D are adjacent to each other. The left end of the upper surface 3E and the upper end of the left surface 3C are adjacent to each other. The right end of the upper surface 3E and the upper end of the right surface 3D are adjacent to each other. The upper end of the rear surface 3B and the rear end of the upper surface 3E are adjacent to each other. The left end of the rear surface 3B and the rear end of the left surface 3C are adjacent to each other. The right end of the rear surface 3B and the rear end of the right surface 3D are adjacent to each other.

The housing 3 includes a left housing 3L and a right housing 3R. The right housing 3R is located on the right of the left housing 3L. The left housing 3L and the right housing 3R are fastened together with multiple screws 3S. The housing 3 includes a pair of housing halves.

The housing cover 4 covers at least a part of the outer surface of the housing 3. The housing cover 4 is formed from an elastomer. The housing cover 4 in the embodiment covers a part of the front surface 3A, a part of the left surface 3C, a part of the right surface 3D, and a part of the upper surface 3E. The housing cover 4 covers the boundary between the front surface 3A and the upper surface 3E, the boundary between the front surface 3A and the left surface 3C, the boundary between the front surface 3A and the right surface 3D, the boundary between the upper surface 3E and the left surface 3C, and the boundary between the upper surface 3E and the right surface 3D.

The battery mount 5 is located on the lower surface 3F of the housing 3. The battery pack 2 is attached to the battery mount 5 in a detachable manner. The battery pack 2 includes a rechargeable battery, which is, for example, a rechargeable lithium-ion battery. The battery pack 2 is slidable. The battery pack 2 is a battery pack for a power tool.

The battery pack 2 includes a housing 2B, a pair of slides 2C, a protrusion 2D, a release button 2E, a pair of power terminals 2F, and a pair of signal terminals 2G. The housing 2B has an attachment surface 2A. The protrusion 2D is supported movably on the housing 2B. The release button 2E is operable to move the protrusion 2D. The housing 2B has an internal space to accommodate a battery cell (not shown). The battery cell includes a rechargeable lithium-ion battery. The slides 2C extend in the front-rear direction. The protrusion 2D is supported movably by a spring. The protrusion 2D protrudes from the attachment surface 2A under an elastic force from the spring. The power terminals 2F are located between the pair of slides 2C. The signal terminals 2G are located between the pair of power terminals 2F.

The battery mount 5 includes guides 5B, a lock 5C, power terminals 5D, and signal terminals 5E.

The lower surface 3F of the housing 3 faces the attachment surface 2A of the battery pack 2.

The guides 5B guide the battery pack 2 in a predetermined guiding direction. The slides 2C on the battery pack 2 are guided along the guides 5B. The battery mount 5 includes two guides 5B arranged in the lateral direction. The guides 5B guide the battery pack 2 in the front-rear direction.

The lock 5C is located on the lower surface 3F of the housing 3. The protrusion 2D on the battery pack 2 is engaged with the lock 5C. This locks the battery pack 2 on the battery mount 5. In response to an operation on the release button 2E, the battery pack 2 is unlocked from the battery mount 5.

The power terminals 5D are connected to the power terminals 2F on the battery pack 2. The signal terminals 5E are connected to the signal terminals 2G on the battery pack 2. This allows the battery pack 2 to supply power to the illumination apparatus 1.

To attach the battery pack 2 to the battery mount 5, the user of the illumination apparatus 1 places the front ends of the slides 2C on the battery pack 2 in contact with the rear ends of the guides 5B on the battery mount 5 and then slides the battery pack 2 forward along the battery mount 5. The battery pack 2 is guided along the guides 5B to move forward. With the protrusion 2D on the battery pack 2 engaged with the lock 5C on the battery mount 5, the battery pack 2 is locked on the battery mount 5. In this manner, the battery pack 2 is slid forward along the battery mount 5 from the rear of the battery mount 5 and is attached to the battery mount 5. The power terminals 2F on the battery pack 2 are connected to the power terminals 5D on the battery mount 5 to supply power from the battery pack 2 to the illumination apparatus 1.

To detach the battery pack 2 from the battery mount 5, the user of the illumination apparatus 1 operates the release button 2E. The protrusion 2D is thus disengaged from the lock 5C. This unlocks the battery pack 2 from the battery mount 5. The battery pack 2 is then slid backward and detached from the battery mount 5.

The illumination apparatus 1 has a smaller dimension than the battery pack 2 in the lateral direction. With the battery pack 2 attached to the battery mount 5, the left surface 3C of the housing 3 does not protrude leftward from a left surface 2L of the housing 2B. The right surface 3D of the housing 3 does not protrude rightward from a right surface 2R of the housing 2B. More specifically, each of the left surface 3C and the right surface 3D of the housing 3 orthogonal to each of the front surface 3A and the upper surface 3E does not protrude outward from the side surfaces of the housing 2B in the battery pack 2.

The illuminator 6 includes a circuit board 13, a circuit board 14, multiple light emitters 15, multiple light emitters 16, a heat sink 17, a reflector 18, a reflector 19, and a light-transmissive member 20. The light emitters 15 are mounted on the circuit board 13. The light emitters 16 are mounted on the circuit board 14. The heat sink 17 is connected to the circuit board 13 and to the circuit board 14. The reflector 18 partially surrounds the light emitters 15. The reflector 19 partially surrounds the light emitters 16. Light emitted from at least the light emitters 15 or the light emitters 16 passes through the light-transmissive member 20.

The circuit board 13 has a surface facing upward. The circuit board 14 has a surface facing frontward.

The light emitters 15 operate with power supplied from the battery pack 2. The light emitters 15 are mounted on the surface (upper surface) of the circuit board 13. The light emitters 15 are light-emitting diodes (LEDs). The light emitters 15 have light-emitting surfaces facing upward. The light emitters 15 (four in the present embodiment) are at intervals in the lateral direction.

The light emitters 16 operate with power supplied from the battery pack 2. The light emitters 16 are mounted on the surface (front surface) of the circuit board 14. The light emitters 16 are LEDs. The light emitters 16 have light-emitting surfaces facing frontward. The light emitters 16 (four in the present embodiment) are at intervals in the lateral direction.

The heat sink 17 dissipates heat from the circuit board 13 and from the circuit board 14 to the surrounding area. The heat sink 17 is formed from a metal. The heat sink 17 is formed from, for example, aluminum. The heat sink 17 includes a first support 17A and a second support 17B. The first support 17A is connected to the back surface (lower surface) of the circuit board 13. The second support 17B is connected to the back surface (rear surface) of the circuit board 14.

The reflector 18 reflects light emitted from the light emitters 15. The reflector 19 reflects light emitted from the light emitters 16. The reflector 18 and the reflector 19 each include a body and a reflective film on a surface of the body. The body is formed from, for example, a polycarbonate resin. The reflective film is a metal film. The reflective film contains, for example, silver. The reflective film is a layer of plating on the body. The surface of the reflective film on the reflector 18 is a reflective surface that reflects light emitted from the light emitters 15. The surface of the reflective film on the reflector 19 is a reflective surface that reflects light emitted from the light emitters 16.

The reflective surface of the reflector 18 surrounds the light emitters 15. The reflective surface of the reflector 18 reflects light emitted from the light emitters 15 to allow at least part of the light to travel upward. The reflector 18 is connected to the surface (upper surface) of the circuit board 13.

The reflective surface of the reflector 19 surrounds the light emitters 16. The reflective surface of the reflector 19 reflects light emitted from the light emitters 16 to allow at least part of the light to travel forward. The reflector 19 is connected to the surface (front surface) of the circuit board 14.

The reflector 18, the circuit board 13, and the first support 17A in the heat sink 17 are fastened with two screws 18S. The reflector 19, the circuit board 14, and the second support 17B in the heat sink 17 are fastened with two screws 19S. The circuit board 13, the circuit board 14, the heat sink 17, the reflector 18, and the reflector 19 are held between the left housing 3L and the right housing 3R. The circuit board 13, the circuit board 14, the heat sink 17, the reflector 18, and the reflector 19 are fixed to the housing 3.

The light-transmissive member 20 covers the light emitters 15 and the light emitters 16. The light-transmissive member 20 is transmissive to light. At least part of light from the light emitters 15 passes through the light-transmissive member 20. The light-transmissive member 20 is a diffuser that diffuses light emitted from the light emitters 15 to the surrounding area. At least part of light from the light emitters 16 passes through the light-transmissive member 20. The light-transmissive member 20 is a diffuser that diffuses light emitted from the light emitters 16 to the surrounding area. The light-transmissive member 20 protects the light emitters 15 and the light emitters 16.

The light-transmissive member 20 is formed from a light-diffusing resin. For light with high directivity emitted from the light emitters 15 and the light emitters 16, the light-transmissive member 20 allows light traveling straight to be less noticeable, thus reducing unevenness in luminance. The illuminator 6 including the light-transmissive member 20 can illuminate the surrounding area with a uniform illuminance distribution.

The light-transmissive member 20 may be formed from a transparent synthetic resin or glass.

The housing 3 has the outer surface including the upper surface 3E and the front surface 3A. The front surface 3A adjacent to the upper surface 3E faces in a direction different from the direction in which the upper surface 3E faces. The light-transmissive member 20 is supported by the housing 3. The light-transmissive member 20 extends on the upper surface 3E and on the front surface 3A of the housing 3.

The housing 3 has the outer surface including the left surface 3C and the right surface 3D each adjacent to the upper surface 3E and the front surface 3A. The left surface 3C faces in a direction different from the directions in which the upper surface 3E and the front surface 3A face. The right surface 3D faces in a direction different from the directions in which the upper surface 3E and the front surface 3A face. The light-transmissive member 20 does not extend to the left surface 3C and the right surface 3D.

The light-transmissive member 20 includes a first light transmitter 21, a second light transmitter 22, and a third light transmitter 23. The first light transmitter 21 is adjacent to the upper surface 3E. The second light transmitter 22 is adjacent to the front surface 3A. The third light transmitter 23 connects the first light transmitter 21 and the second light transmitter 22.

The first light transmitter 21 has an incident surface 21A and an emission surface 21B. Light from the light emitters 15 is incident on the incident surface 21A. Light from the light emitters 15 is emitted through the emission surface 21B. The first light transmitter 21 is substantially a flat plate. The incident surface 21A and the emission surface 21B are both substantially flat. The incident surface 21A and the emission surface 21B are parallel to each other. The incident surface 21A and the emission surface 21B are both substantially orthogonal to the vertical axis. In the embodiment, as shown in FIG. 5, the emission surface 21B is curved with its middle portion in the lateral direction slightly expanding upward.

The incident surface 21A faces downward. The emission surface 21B faces upward. The emission surface 21B is adjacent to the upper surface 3E of the housing 3. The upper surface 3E of the housing 3 partially surrounds the emission surface 21B. The emission surface 21B faces in the same direction as the upper surface 3E of the housing 3.

The second light transmitter 22 has an incident surface 22A and an emission surface 22B. Light from the light emitters 16 is incident on the incident surface 22A. Light from the light emitters 16 is emitted through the emission surface 22B. The second light transmitter 22 is substantially a flat plate. The incident surface 22A and the emission surface 22B are both substantially flat. The incident surface 22A and the emission surface 22B are parallel to each other. The incident surface 22A and the emission surface 22B are both substantially orthogonal to the front-rear axis. In the embodiment, as shown in FIG. 4, the emission surface 22B is curved with its middle portion in the lateral direction slightly expanding frontward.

The incident surface 22A faces rearward. The emission surface 22B faces frontward. The emission surface 22B is adjacent to the front surface 3A of the housing 3. The front surface 3A of the housing 3 partially surrounds the emission surface 22B. The emission surface 22B faces in the same direction as the front surface 3A of the housing 3.

The angle between the first light transmitter 21 and the second light transmitter 22 is substantially a right angle. The angle between the first light transmitter 21 and the second light transmitter 22 may be the smaller one of the angle between the incident surface 21A and the incident surface 22A and the angle between the emission surface 21B and the emission surface 22B.

The third light transmitter 23 has an incident surface 23A and an emission surface 23B. Light from the light emitters 15, from the light emitters 16, or from both the light emitters 15 and the light emitters 16 is incident on the incident surface 23A. Light from the light emitters 15, from the light emitters 16, or from both the light emitters 15 and the light emitters 16 is emitted through the emission surface 23B. The third light transmitter 23 bends to connect the front end of the first light transmitter 21 and the upper end of the second light transmitter 22. The incident surface 23A connects the front end of the incident surface 21A and the upper end of the incident surface 22A. The emission surface 23B connects the front end of the emission surface 21B and the upper end of the emission surface 22B.

The incident surface 23A is curved in a cross section orthogonal to each of the incident surface 21A and the incident surface 22A. The incident surface 23A is recessed upward and frontward in an arc in the cross section orthogonal to each of the incident surface 21A and the incident surface 22A.

The emission surface 23B is curved in a cross section orthogonal to each of the emission surface 21B and the emission surface 22B. The emission surface 23B is curved upward and frontward in an arc in the cross section orthogonal to each of the emission surface 21B and the emission surface 22B.

The light emitters 15 are located below the first light transmitter 21. The light emitters 15 face the incident surface 21A of the first light transmitter 21. Light emitted from the light emitters 15 is incident on the incident surface 21A and is emitted through the emission surface 21B. At least part of the light incident on the incident surface 21A is emitted through the emission surface 23B of the third light transmitter 23.

The light emitters 16 are located at the rear of the second light transmitter 22. The light emitters 16 face the incident surface 22A of the second light transmitter 22. Light emitted from the light emitters 16 is incident on the incident surface 22A and is emitted through the emission surface 22B. At least part of the light incident on the incident surface 22A is emitted through the emission surface 23B of the third light transmitter 23.

At least part of light emitted from the light emitters 15 is incident on the incident surface 23A. At least part of light emitted from the light emitters 16 is incident on the incident surface 23A. Light incident on the incident surface 23A is emitted through the emission surface 23B.

The light emitters 15 are attached to the circuit board 13. The light emitters 16 are attached to the circuit board 14. The circuit board 13 and the circuit board 14 are orthogonal to each other in the cross section orthogonal to the emission surface 21B and to the emission surface 22B. The light emitters 15 are mounted on the upper surface of the circuit board 13 serving as a mount surface. The light emitters 16 are mounted on the front surface of the circuit board 14 serving as a mount surface. The upper surface of the circuit board 13 and the front surface of the circuit board 14 are substantially orthogonal to each other in the cross section orthogonal to the emission surface 21B and to the emission surface 22B.

The circuit board 13 and the circuit board 14 may be in contact with each other. The circuit board 13 and the circuit board 14 may be located across a space with a dimension less than or equal to the thicknesses of the circuit board 13 and the circuit board 14.

The controller 7 controls at least the light emitters 15 and the light emitters 16. The controller 7 includes a circuit board and multiple electronic components mounted on the circuit board. The electronic components include, for example, a microcomputer. In the embodiment, the four light emitters 15 are turned on or off simultaneously. The four light emitters 16 are turned on or off simultaneously. The light emitters 15 and the light emitters 16 can be turned on simultaneously. The light emitters 15 and the light emitters 16 can be turned on separately. The controller 7 switches the light emitters between a first illuminating state, a second illuminating state, a fully illuminating state, and a non-illuminating state. In the first illuminating state, the light emitters 15 are turned on, and the light emitters 16 are turned off. In the second illuminating state, the light emitters 16 are turned on, and the light emitters 15 are turned off. In the fully illuminating state, the light emitters 15 and the light emitters 16 are both turned on. In the non-illuminating state, the light emitters 15 and the light emitters 16 are both turned off.

The power button 8 is operable by the user to turn on or off the light emitters 15 and the light emitters 16. The power button 8 is at least partially located on the upper surface 3E of the housing 3. As shown in FIGS. 9 and 10, the power button 8 includes a button 8A and a rod 8B. The button 8A is located on the upper surface 3E of the housing 3. The rod 8B extends downward from the button 8A. A switching element 7A faces the lower end of the rod 8B. The switching element 7A is mounted on a surface of a circuit board in the controller 7. When the user presses the button 8A downward from above, the rod 8B pushes the switching element 7A. This causes the controller 7 to turn on or off the light emitters 15 and the light emitters 16. A coil spring 8C surrounds the rod 8B. The coil spring 8C generates an elastic force for moving the power button 8 upward. When the user releases the power button 8, the power button 8 returns to its initial position under an elastic force from the coil spring 8C.

The operations on the power button 8 include a short-press operation and a long-press operation. The short-press operation refers to pressing the power button 8 for a short time. The long-press operation refers to pressing the power button 8 for a long time.

In the fully illuminating state, a short-press operation on the power button 8 switches the fully illuminating state to the first illuminating state. In the first illuminating state, a short-press operation on the power button 8 switches the first illuminating state to the second illuminating state. In the second illuminating state, a short-press operation on the power button 8 switches the second illuminating state to the non-illuminating state. In each of the fully illuminating state, the first illuminating state, and the second illuminating state, a long-press operation on the power button 8 switches the illuminating state to the non-illuminating state.

In the non-illuminating state, a short-press operation on the power button 8 switches the non-illuminating state to one of the fully illuminating state, the first illuminating state, or the second illuminating state. The controller 7 stores the illuminating state immediately before the non-illuminating state. For example, for the illuminating state immediately before the non-illuminating state being the fully illuminating state, a short-press operation on the power button 8 in the non-illuminating state switches the non-illuminating state to the fully illuminating state. For the illuminating state immediately before the non-illuminating state being the first illuminating state, a short-press operation on the power button 8 in the non-illuminating state switches the non-illuminating state to the first illuminating state. For the illuminating state immediately before the non-illuminating state being the second illuminating state, a short-press operation on the power button 8 in the non-illuminating state switches the non-illuminating state to the second illuminating state.

As shown in FIGS. 1 to 11, the illumination apparatus 1 may be used with the battery pack 2 under the illumination apparatus 1. The illumination apparatus 1 may be used with the lower surface of the battery pack 2 facing any support surface such as the floor at a work site or the upper surface of a work table.

The illumination apparatus 1 has a smaller dimension than the battery pack 2 in the lateral direction. The left surface 3C of the housing 3 does not protrude leftward from the left surface 2L of the housing 2B. The right surface 3D of the housing 3 does not protrude rightward from the right surface 2R of the housing 2B. More specifically, the left surface 3C and the right surface 3D of the housing 3 orthogonal to the front surface 3A and the upper surface 3E do not protrude outward from the side surfaces of the housing 2B. The illumination apparatus 1 may thus be used with, for example, the left surface 2L of the battery pack 2 and the left surface 3C of the housing 3 facing a support surface. The illumination apparatus 1 may be used with, for example, the right surface 2R of the battery pack 2 and the right surface 3D of the housing 3 facing a support surface. In other words, the illumination apparatus 1 in the state shown in FIG. 1 may be, for example, placed on its side in use.

Figure 11:
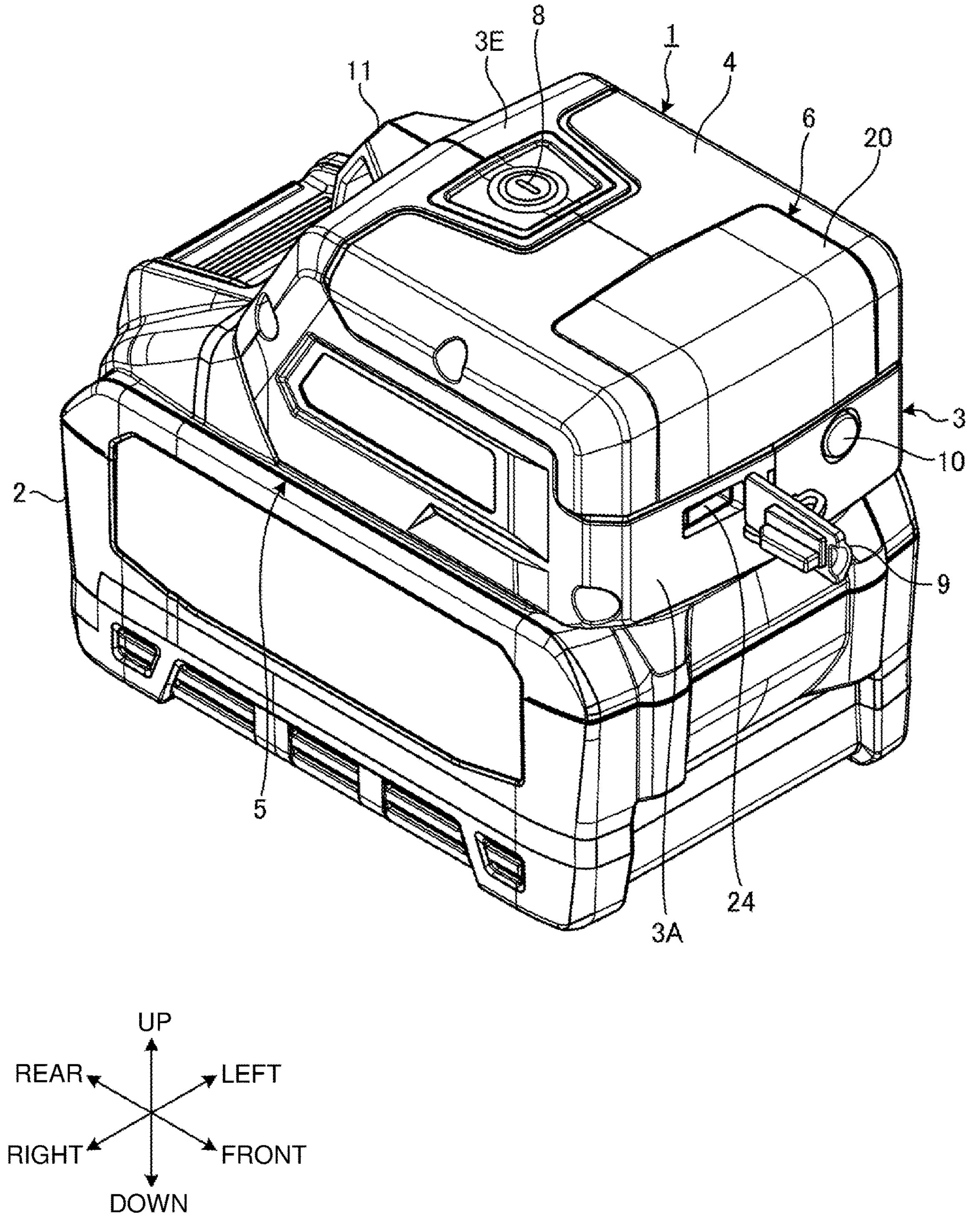
FIG. 11 is a perspective view of the illumination apparatus according to the embodiment with an output terminal cover being open.

FIG. 11 is a perspective view of the illumination apparatus 1 according to the embodiment with the output terminal cover 9 being open. The output terminal cover 9 covers an output terminal 24. The output terminal cover 9 is located on the front surface 3A of the housing 3. The output terminal 24 in the embodiment is a universal serial bus (USB) terminal. The output terminal 24 outputs power from the battery pack 2. The illumination apparatus 1 can be used to charge, for example, a rechargeable battery in an electronic device such as a mobile terminal. The output terminal 24 may be connected to the electronic device with a USB cable to charge the rechargeable battery in the electronic device with power output from the battery pack 2 through the output terminal 24.

The output button 10 is operable by the user to switch between outputting and stopping power from the output terminal 24. The output button 10 is located on the front surface 3A of the housing 3. When the output button 10 is pressed once with no power being output from the output terminal 24, power is output from the output terminal 24 to the rechargeable battery in the electronic device through the USB cable, starting charging of the rechargeable battery. When the output button 10 is pressed once in this state, the output of power from the output terminal 24 is stopped, stopping charging of the rechargeable battery. In the embodiment, the output button 10 incorporates a light emitter. The light emitter in the output button 10 is turned on while power is being output from the output terminal 24. The light emitter in the output button 10 is turned off when no power is being output from the output terminal 24.

Figure 12:
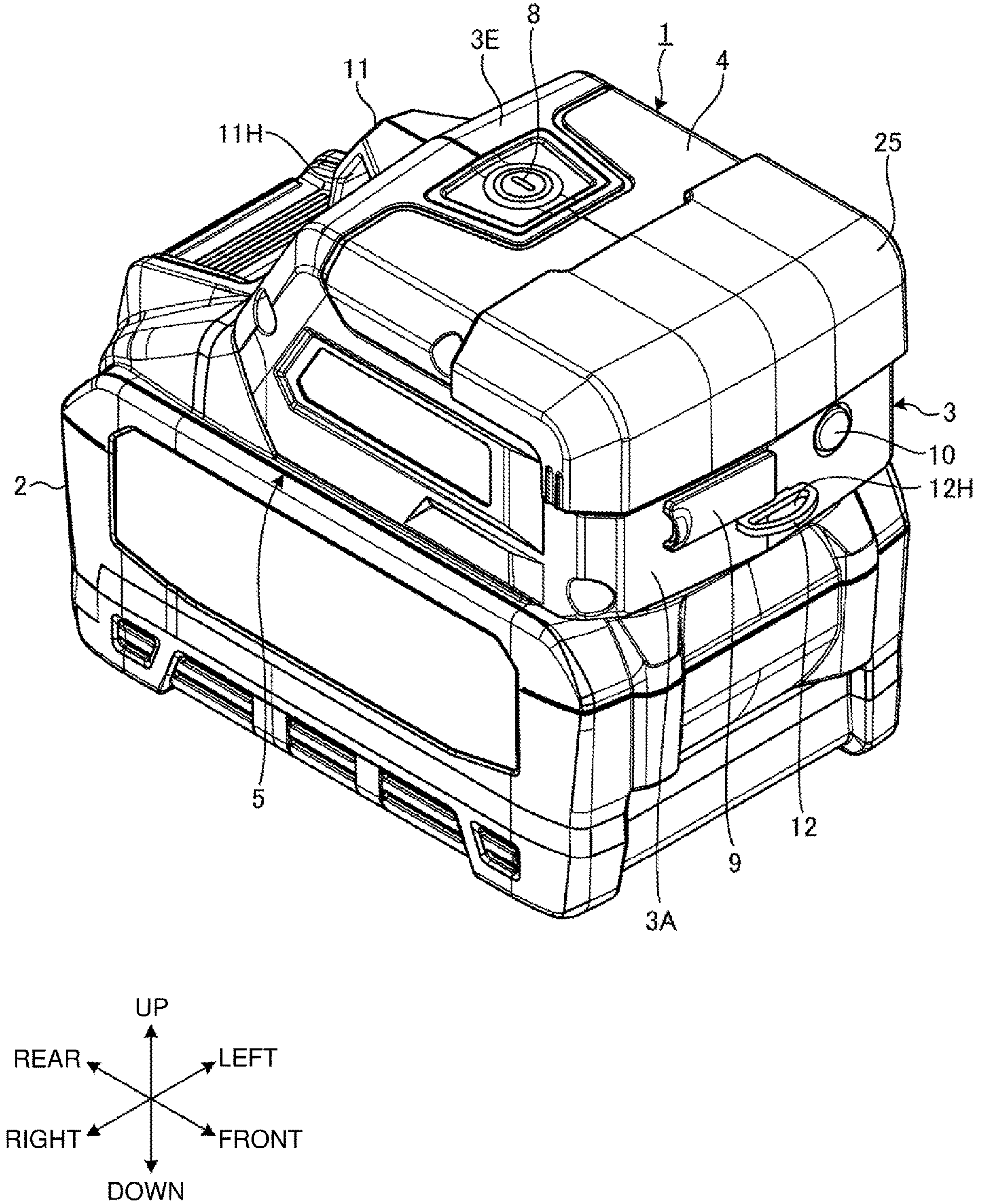
FIG. 12 is a perspective view of the illumination apparatus according to the embodiment with a second light-transmissive member attached as viewed from the right front.
Figure 13:
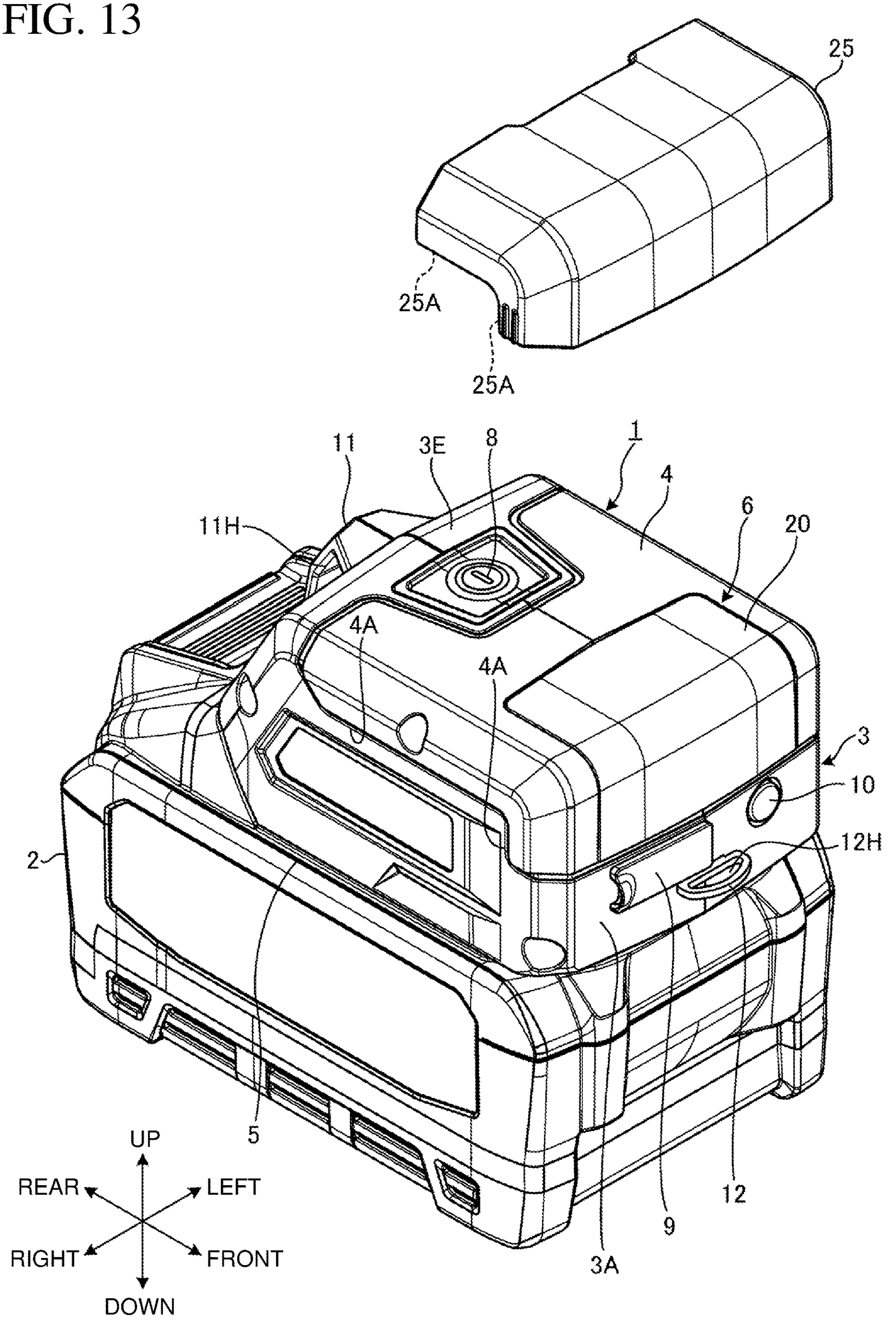
FIG. 13 is a perspective view of the second light-transmissive member and the illumination apparatus according to the embodiment as viewed from the right front.
Figure 14:
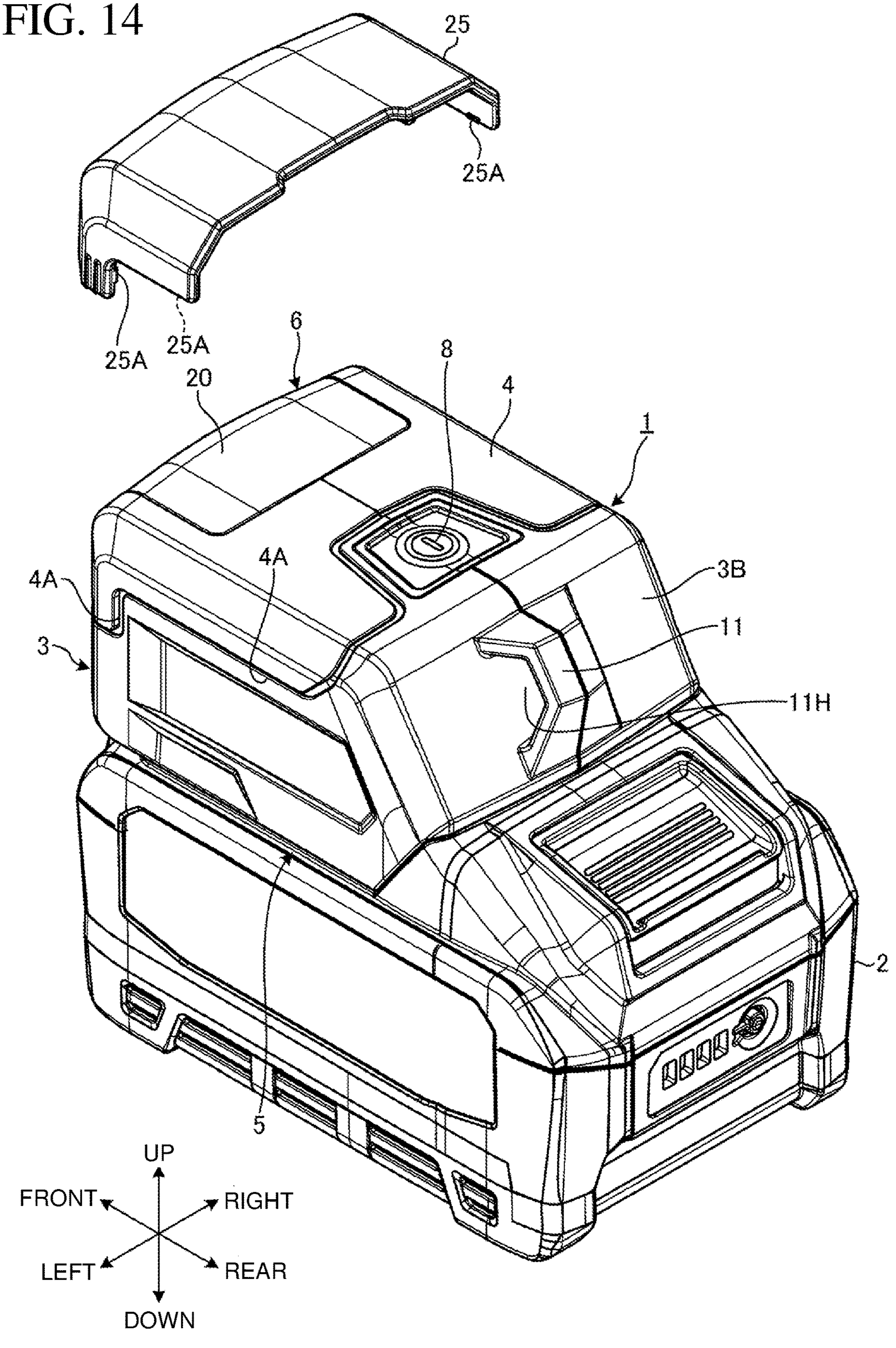
FIG. 14 is a perspective view of the second light-transmissive member and the illumination apparatus according to the embodiment as viewed from the left.
Figure 15:
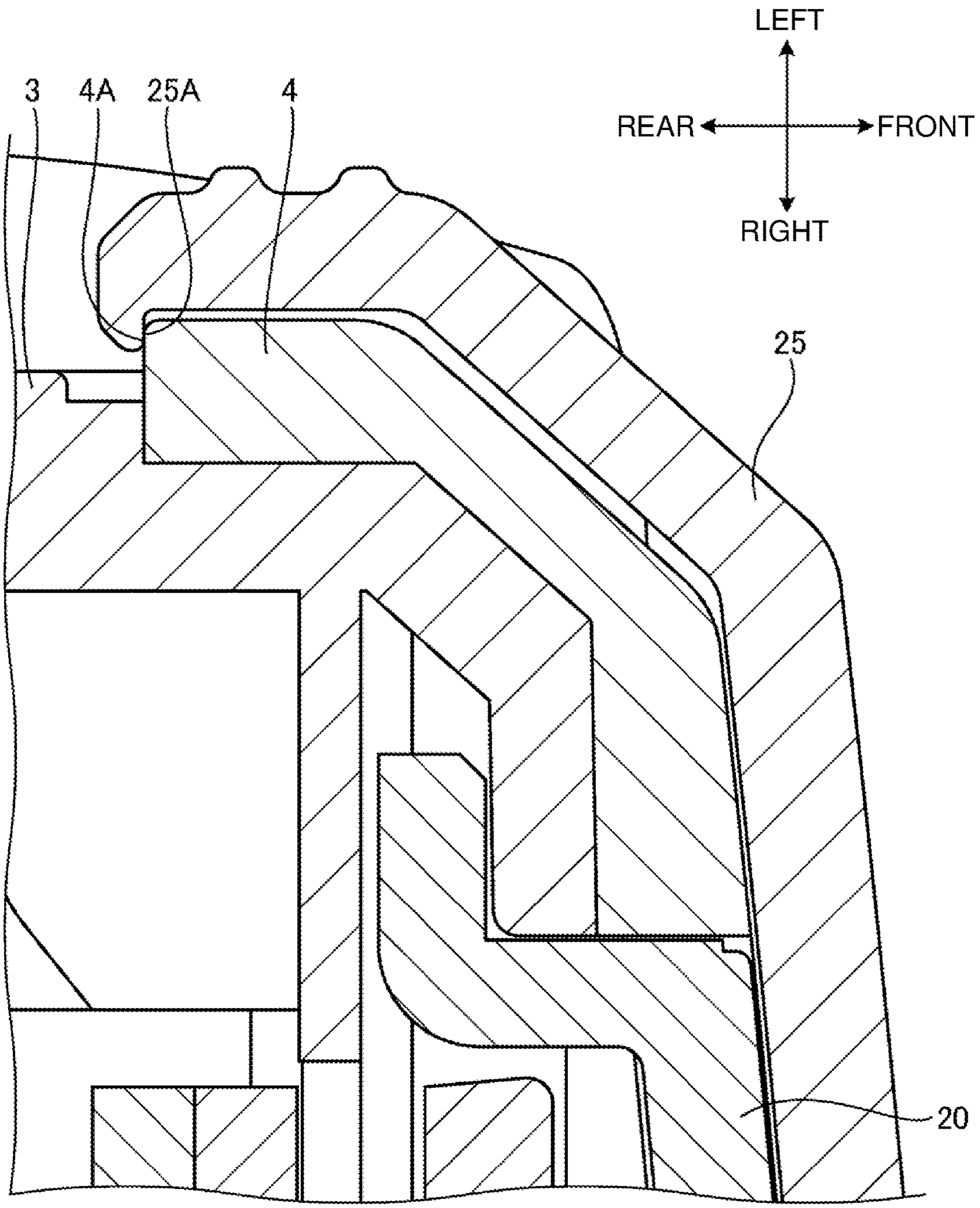
FIG. 15 is a partial cross-sectional view of the illumination apparatus according to the embodiment with the second light-transmissive member attached.

FIG. 12 is a perspective view of the illumination apparatus 1 according to the embodiment with a second light-transmissive member 25 attached as viewed from the right front. FIG. 13 is a perspective view of the second light-transmissive member 25 and the illumination apparatus 1 as viewed from the right front. FIG. 14 is a perspective view of the second light-transmissive member 25 and the illumination apparatus 1 as viewed from the left. FIG. 15 is a partial cross-sectional view of the illumination apparatus 1 with the second light-transmissive member 25 attached.

The light-transmissive member 20 may be covered with the second light-transmissive member 25. The second light-transmissive member 25 changes the color of light emitted through the light-transmissive member 20 and allows emission of light with the changed color. The second light-transmissive member 25 is formed from a synthetic resin containing a colored pigment. The second light-transmissive member 25 has a warm color such as orange, yellow, or red. The second light-transmissive member 25 allows emission of light with a warm color. The second light-transmissive member 25 may have a cool color such as blue or a neutral color such as green or purple, rather than a warm color. In other words, light emitted through the second light-transmissive member 25 may be light with a cool color such as blue or light with a neutral color such as green or purple, rather than light with a warm color. The second light-transmissive member 25 may reduce the glare of light emitted through the light-transmissive member 20.

The second light-transmissive member 25 includes hook portions 25A that can be hooked on at least parts of the housing 3. The housing 3 includes locks 4A engaged with the second light-transmissive member 25 covering the light-transmissive member 20. The locks 4A in the embodiment are located at the boundary between the housing 3 and the housing cover 4. With the hook portions 25A hooked on the locks 4A, the second light-transmissive member is attached to the housing 3 to cover the light-transmissive member 20. With the hook portions 25A unhooked from the locks 4A, the second light-transmissive member 25 can be detached from the housing 3.

The first coupler 11 is located on the rear surface 3B of the housing 3 opposite to the front surface 3A. The first coupler

11 protrudes rearward from the rear surface 3B. The first coupler 11 is annular. The first coupler 11 has an opening 11H extending through the first coupler 11 in the lateral direction. The first coupler 11 is formed from a synthetic resin.

The second coupler 12 is located on the front surface 3A of the housing 3. The second coupler 12 protrudes frontward from the front surface 3A. The second coupler 12 is annular. The second coupler 12 has an opening 12H extending through second coupler 12 in the vertical direction. The second coupler 12 is formed from a metal.

A hanging member 26 is attachable to the first coupler 11 and the second coupler 12.

Figure 16:
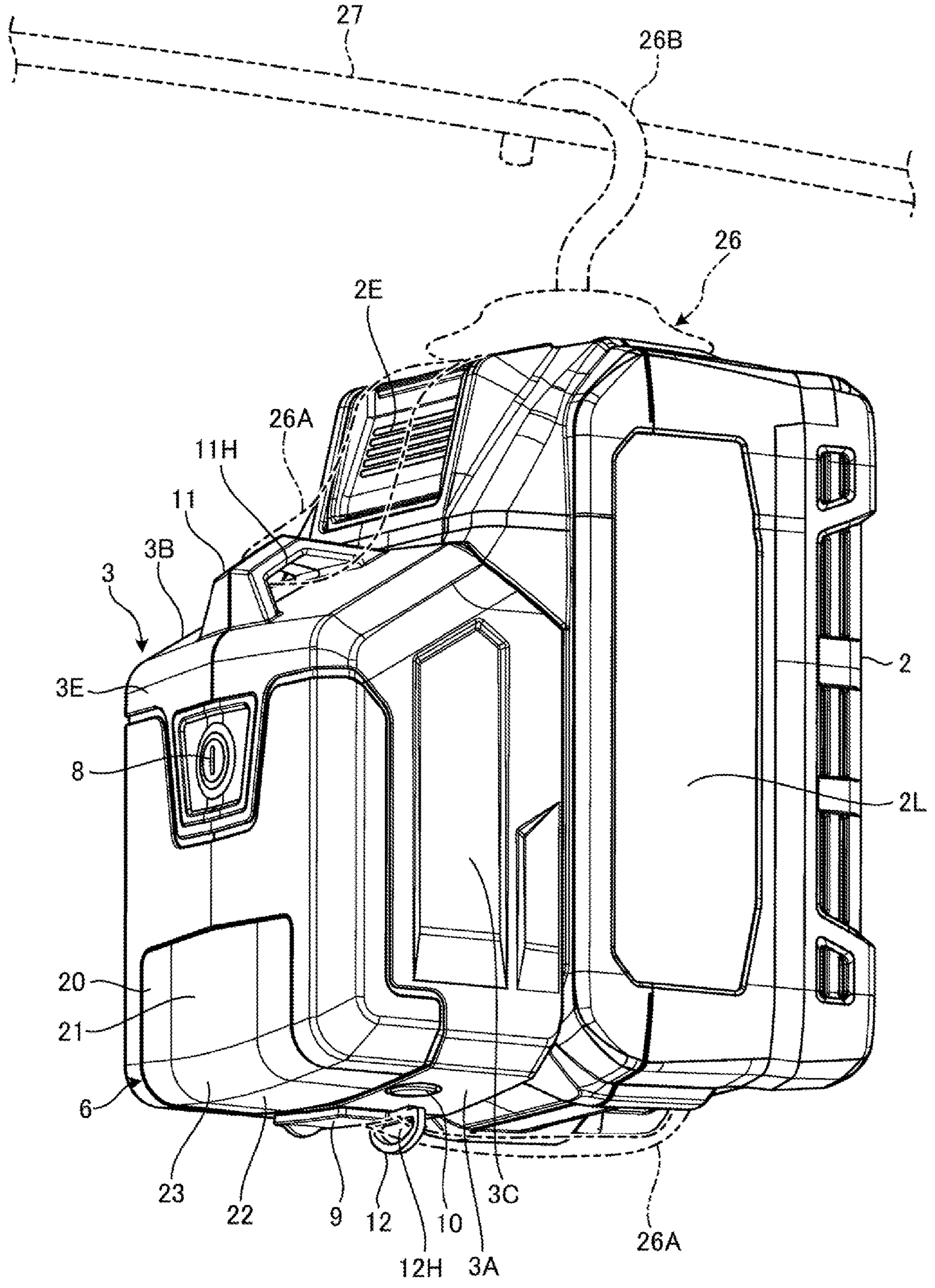
FIG. 16 is a view of the illumination apparatus according to the embodiment with a hanging member attached.

FIG. 16 shows the illumination apparatus 1 according to the embodiment with the hanging member 26 attached. The hanging member 26 includes a belt 26A and a hook 26B. The belt 26A is attached to the first coupler 11. The hook 26B is connected to a part of the belt 26A. In the example shown in FIG. 16, a part of the belt 26A is attached to the first coupler 11, and another part of the belt 26A is attached to the second coupler 12. The belt 26A is placed through the opening 11H in the first coupler 11 and is thus attached to the first coupler 11. The belt 26A is placed thorough the opening 12H in the second coupler 12 and is thus attached to the second coupler 12. The hook 26B is hung on a structure 27 at a work site. The illumination apparatus 1 and the battery pack 2 are thus hung from the structure 27 with the hanging member 26. The illumination apparatus 1 hung with the second light transmitter 22 facing downward can illuminate a target from above.

The illumination apparatus 1 according to the embodiment includes the housing 3, the light emitters 15 and 16 operable with power supplied from the battery pack 2, and the light-transmissive member 20 supported by the housing 3 and transmissive to at least part of light from the light emitters 15 and 16. The housing 3 has the outer surface including the upper surface 3E being a first outer surface and the front surface 3A being a second outer surface. The front surface 3A is adjacent to the upper surface 3E and faces in a direction different from a direction in which the upper surface 3E faces. The light-transmissive member 20 extends on the upper surface 3E and on the front surface 3A.

In the above structure, the light-transmissive member 20 extends on the upper surface 3E and on the front surface 3A of the housing 3. This allows light emitted from the light emitters 15 to illuminate the space facing the upper surface 3E, and light emitted from the light emitters 16 to illuminate the space facing the front surface 3A. The upper surface 3E and the front surface 3A face in different directions. This allows light emitted from the light emitters 15 and the light emitters 16 to illuminate a wide area. The light-transmissive member being a single piece allows light emitted from the light emitters 15 and the light emitters 16 to efficiently illuminate the surrounding area of the light-transmissive member 20. The illumination apparatus 1 can thus efficiently illuminate a wide area.

The light-transmissive member 20 in the embodiment includes the first light transmitter 21 adjacent to the upper surface 3E, the second light transmitter 22 adjacent to the front surface 3A, and the third light transmitter 23 connecting the first light transmitter 21 and the second light transmitter 22.

This allows light emitted from the light emitters 15 to efficiently illuminate the surrounding area of the light-transmissive member 20 through the first light transmitter 21 and the third light transmitter 23, and light emitted from the light emitters 16 to efficiently illuminate the surrounding area of the light-transmissive member 20 through the second light transmitter 22 and the third light transmitter 23.

The first light transmitter 21 includes a flat plate. The second light transmitter 22 includes a flat plate. The third light transmitter 23 bends and connects the first light transmitter 21 and the second light transmitter 22.

This allows light emitted from the light emitters 15 to efficiently illuminate the surrounding area of the light-transmissive member 20 through the first light transmitter 21 and the third light transmitter 23, and light emitted from the light emitters 16 to efficiently illuminate the surrounding area of the light-transmissive member 20 through the second light transmitter 22 and the third light transmitter 23.

In the embodiment, the first light transmitter 21 has the emission surface 21B (first emission surface 21B) adjacent to the upper surface 3E and facing in the same direction as the upper surface 3E. The second light transmitter 22 has the emission surface 22B (second emission surface 22B) adjacent to the front surface 3A and facing in the same direction as the front surface 3A. The third light transmitter 23 has the emission surface 23B (third emission surface 23B) connecting the emission surface 21B and the emission surface 22B and curved in the cross section orthogonal to each of the emission surface 21B and the emission surface 22B.

This allows light emitted from the light emitters 15 to efficiently illuminate the surrounding area of the light-transmissive member 20 through the first light transmitter 21 and the third light transmitter 23, and light emitted from the light emitters 16 to efficiently illuminate the surrounding area of the light-transmissive member 20 through the second light transmitter 22 and the third light transmitter 23.

The light emitters 15 each being a first light emitter face the incident surface 21A of the first light transmitter 21. The light emitters 16 each being a second light emitter face the incident surface 22A of the second light transmitter 22.

The illumination apparatus 1 can thus be easily assembled.

The illumination apparatus 1 according to the embodiment includes the circuit board 13 being a first substrate on which the light emitters 15 are attached, and the circuit board 14 being a second substrate on which the light emitters 16 are attached.

The circuit board 13 and the circuit board 14 are orthogonal to each other in the cross section orthogonal to each of the emission surface 21B and the emission surface 22B.

In this structure, the light emitters 15 and the light emitters 16 are located adjacent to the third light transmitter 23 at the corner of the light-transmissive member 20, thus allowing the illumination apparatus 1 to uniformly illuminate a wide area. The illumination apparatus 1 can reduce, for example, darkness of the area around the third light transmitter 23 at the corner of the light-transmissive member 20.

The housing 3 in the embodiment includes the battery mount 5 to which the battery pack 2 is attachable.

The light emitters 15 and the light emitters 16 thus operate with power supplied from the battery pack 2 attached to the battery mount 5.

The housing 3 in the embodiment includes the locks 4A engaged with the second light-transmissive member 25 covering the light-transmissive member 20.

The second light-transmissive member 25 is thus locked on the housing 3.

The light-transmissive member 20 in the embodiment includes the diffuser.

The light-transmissive member 20 including the diffuser that diffuses at least part of light from the light emitters 15 and the light emitters 16 allows the illumination apparatus 1 to uniformly illuminate a wider area.

In the embodiment, the outer surface of the housing 3 includes the left surface 3C and the right surface 3D each being a third outer surface orthogonal to each of the upper surface 3E and the front surface 3A. The left surface 3C does not protrude leftward (outward) from the left surface 2L being one side surface of the battery pack 2. The right surface 3D does not protrude rightward (outward) from the right surface 2R being another side surface of the battery pack 2.

The illumination apparatus 1 can thus be placed on a support surface with a side surface of the battery pack 2 facing the support surface.

In the embodiment, the left surface 3C and the right surface 3D each being the third outer surface are adjacent to the upper surface 3E and the front surface 3A. The light-transmissive member 20 does not extend to the left surface 3C and the right surface 3D.

This structure does not allow light emitted from the light emitters 15 and the light emitters 16 to illuminate the spaces facing the left surface 3C and the right surface 3D, although the light illuminates the spaces facing the upper surface 3E and the front surface 3A. This reduces illumination of unintended spaces with light emitted from the light emitters 15 and the light emitters 16.

In the embodiment, the outer surface of the housing 3 includes the rear surface 3B opposite to the front surface 3A. The housing 3 includes, on the rear surface 3B, the first coupler 11 to which the hanging member 26 is attachable.

The housing 3 is hung from the hanging member 26 with the front surface 3A facing downward, thus allowing light emitted from the light emitters 15 and the light emitters 16 to illuminate the space below the illumination apparatus 1.

The housing 3 in the embodiment includes, on the front surface 3A, the second coupler 12 to which the hanging member 26 is attachable.

This allows the hanging member 26 to hang the housing 3 more stably.

REFERENCE SIGNS LIST

1 illumination apparatus
2 battery pack
2A attachment surface
2B housing
2C slide
2D protrusion
2E release button
2F power terminal
2G signal terminal
2L left surface
2R right surface
3 housing
3A front surface
3B rear surface
3C left surface
3D right surface
3E upper surface
3F lower surface
3L left housing
3R right housing
3S screw
4 housing cover
4A lock
5 battery mount
5B guide
5C lock
5D power terminal
5E signal terminal
6 illuminator
7 controller
7A switching element
8 power button
8A button
8B rod
8C coil spring
9 output terminal cover
10 output button
11 first coupler
11H opening
12 second coupler
12H opening
13 circuit board
14 circuit board
15 light emitter (first light emitter)
16 light emitter (second light emitter)
17 heat sink
17A first support
17B second support
18 reflector
18S screw
19 reflector
19S screw
20 light-transmissive member
21 first light transmitter
21A incident surface
21B emission surface
22 second light transmitter
22A incident surface
22B emission surface
23 third light transmitter
23A incident surface
23B emission surface
24 output terminal
25 second light-transmissive member
25A hook portion
26 hanging member
26A belt
26B hook
27 structure

What is claimed is:

1. An illumination apparatus, comprising:

a housing having an outer surface including
 a first outer surface,
 a second outer surface adjacent to the first outer surface, the second outer surface facing in a direction different from a direction in which the first outer surface faces, and
 a battery mount to which a battery pack is attachable, the battery mount including a guide portion extending in a front-rear direction, the battery mount having an opening at a rear of the battery mount;

a light emitter operable with power supplied from the battery pack; and a light-transmissive member supported by the housing, the light-transmissive member being transmissive to at least part of light from the light emitter, the light-transmissive member extending on the first outer surface and on the second outer surface, wherein the battery mount is on a lower surface of the housing,
the battery pack is slid forward along the battery mount from the rear of the battery mount to be attached to the battery mount, and
the first outer surface is an upper surface of the housing.

2. The illumination apparatus according to claim 1, wherein
the light-transmissive member includes
a first light transmitter adjacent to the first outer surface,
a second light transmitter adjacent to the second outer surface, and
a third light transmitter connecting the first light transmitter and the second light transmitter.

3. The illumination apparatus according to claim 2, wherein
the first light transmitter includes a flat plate,
the second light transmitter includes a flat plate, and
the third light transmitter bends and connects the first light transmitter and the second light transmitter.

4. The illumination apparatus according to claim 3, wherein
the first light transmitter has a first emission surface,
the second light transmitter has a second emission surface,
the third light transmitter has a third emission surface,
the first emission surface is adjacent to the first outer surface and faces in a same direction as the first outer surface,
the second emission surface is adjacent to the second outer surface and faces in a same direction as the second outer surface, and
the third emission surface connects the first emission surface and the second emission surface and is curved in a cross section orthogonal to each of the first emission surface and the second emission surface.

5. The illumination apparatus according to claim 4, wherein
the light emitter includes
a first light emitter facing an incident surface of the first light transmitter, and
a second light emitter facing an incident surface of the second light transmitter.

6. The illumination apparatus according to claim 5, further comprising:
a first substrate on which the first light emitter is attached; and
a second substrate on which the second light emitter is attached,
wherein the first substrate and the second substrate are orthogonal to each other, and the first substrate and second substrate meet at an intersection that extends in a direction orthogonal to each of the first emission surface and the second emission surface.

7. The illumination apparatus according to claim 1, wherein the second outer surface is a front surface of the housing.

8. The illumination apparatus according to claim 1, wherein the housing includes a lock engaged with a second light-transmissive member covering the light-transmissive member.

9. The illumination apparatus according to claim 1, wherein the light-transmissive member includes a diffuser.

10. The illumination apparatus according to claim 1, wherein
the outer surface of the housing includes a third outer surface orthogonal to each of the first outer surface and the second outer surface, and
the third outer surface does not protrude from a side surface of the battery pack attached to the illumination apparatus.

11. The illumination apparatus according to claim 10, wherein
the third outer surface is adjacent to the first outer surface and the second outer surface, and
the light-transmissive member does not extend to the third outer surface.

12. The illumination apparatus according to claim 1, wherein
the outer surface of the housing includes a fourth outer surface opposite to the second outer surface, and
the housing includes, on the fourth outer surface, a first coupler to which a hanging member is attachable.

13. The illumination apparatus according to claim 12, wherein the housing includes, on the second outer surface, a second coupler to which the hanging member is attachable.

14. The illumination apparatus according to claim 3, wherein
the light emitter includes
a first light emitter facing an incident surface of the first light transmitter, and
a second light emitter facing an incident surface of the second light transmitter.

15. The illumination apparatus according to claim 4, wherein
the light emitter includes
a first light emitter facing an incident surface of the first light transmitter, and
a second light emitter facing an incident surface of the second light transmitter.

16. The illumination apparatus according to claim 1, wherein the illumination apparatus has a smaller dimension than the battery pack in a lateral direction orthogonal to the directions that the first and the second outer surfaces face.

17. The illumination apparatus according to claim 1, wherein
the outer surface of the housing includes a third outer surface orthogonal to each of the first outer surface and the second outer surface,
the third outer surface is adjacent to the first outer surface and the second outer surface, and
the first outer surface has two front portions located at both ends of the first outer surface in a lateral direction, each of the two front portions being located between the light-transmissive member and the third outer surface.

* * * * *